United States Patent

[11] 3,577,009

[72] Inventor Laurence C. Hofmeister
Fort Lauderdale, Fla.
[21] Appl. No. 799,772
[22] Filed Feb. 17, 1969
[45] Patented May 4, 1971
[73] Assignee The Bendix Corporation

[54] QUADRATURE REJECTION AND FREQUENCY CONVERSION CIRCUIT
10 Claims, 1 Drawing Fig.

[52] U.S. Cl. .......... 307/233, 307/232, 307/304, 328/166, 307/271
[51] Int. Cl. .......... H03b 3/04
[50] Field of Search .......... 307/240, 232, 233, 295, 304, 271; 328/165, 166, 167

[56] References Cited
UNITED STATES PATENTS

| | | | |
|---|---|---|---|
| 3,065,361 | 11/1962 | Brook .......... | 307/232 |
| 3,244,987 | 4/1966 | Prapis et al. .......... | 307/232X |
| 3,348,157 | 10/1967 | Sullivan et al. .......... | 328/166X |
| 3,426,283 | 2/1969 | Thor .......... | 328/166 |

*Primary Examiner*—John S. Heyman
*Attorneys*—Plante, Arens, Hartz, Hix & Smith, Bruce L. Lamb, William G. Christoforo and Lester L. Hallacher

ABSTRACT: A circuit for eliminating quadrature components from a sinusoidal input signal is described. The circuit also divides the frequency of the input signal and converts it into a square wave. Conversion of the input is achieved by the use of a dividing signal and tandem connected gating circuits which operate on the sinusoidal input signal.

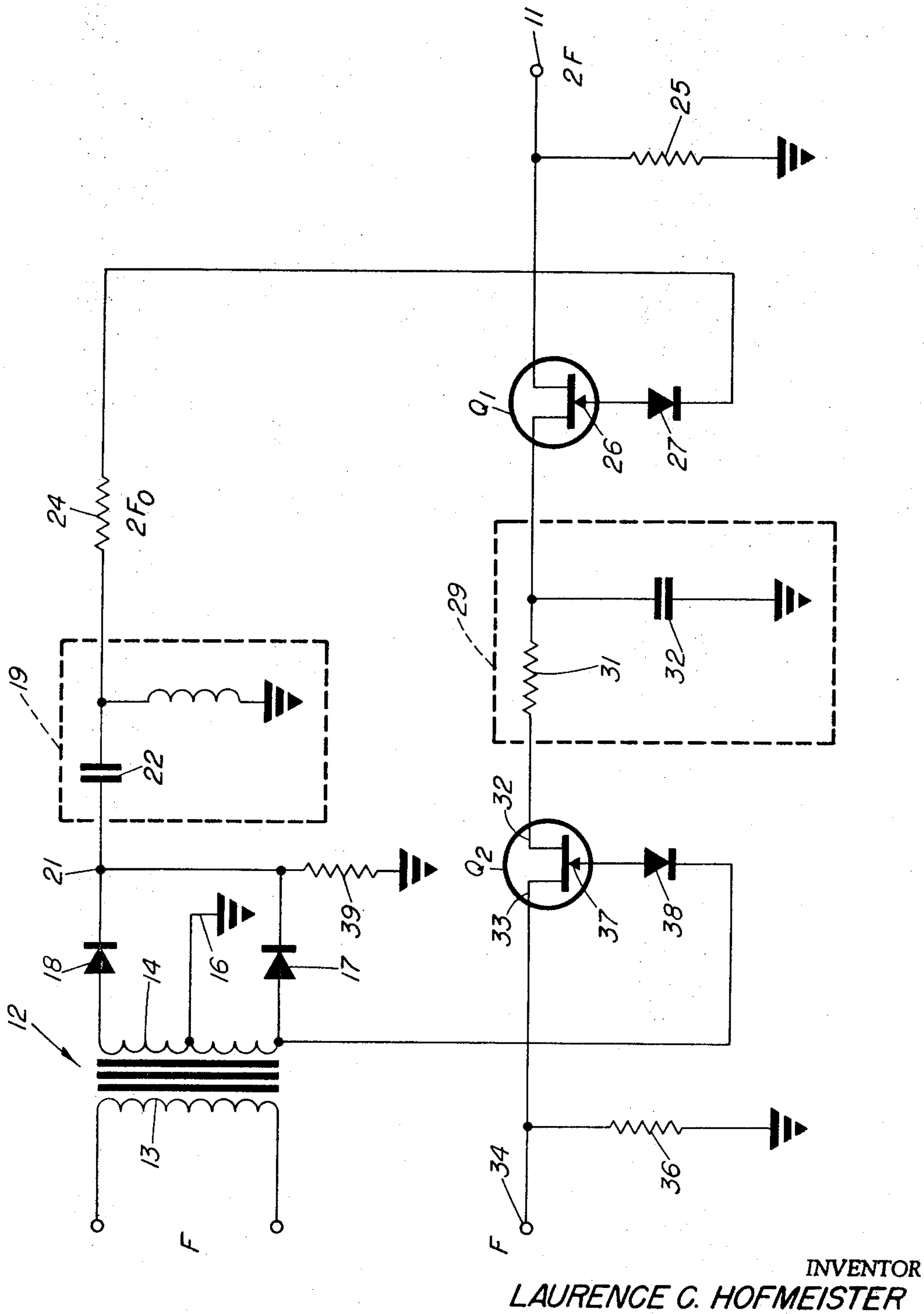
INVENTOR
LAURENCE C. HOFMEISTER
BY [signature]
ATTORNEY

QUADRATURE REJECTION AND FREQUENCY CONVERSION CIRCUIT

Various types of equipment receive sinusoidal inputs which contain undesirable quadrature components. In many of these systems the operational characteristics and efficiency are greatly enhanced by elimination of the quadrature components. As an example, a servosystem operating from a sinusoidal error signal may be subjected to quadrature components contained within the error signal. Such quadrature components are detrimental to the optimum operation of the servosystem. Accordingly, they should not be present in the error signal. However, because they are frequently generated by the sensing element of the servosystem, the prevention of their generation is extremely difficult. It is therefore necessary to employ circuitry which eliminates such components.

The present-day trend in many types of equipment is toward the use of digital techniques. In such systems, the analog error or control signals are converted into pulse trains having pulse amplitudes and/or spacing which vary in accordance with variations in the analog signal. The present invention is a relatively simple circuit which removes quadrature components from a sinusoidal input signal and simultaneously converts it into a square wave pulse train having a frequency which is a submultiple of the input frequency.

It is therefore an object of this invention to provide a circuit which removes the quadrature components from a sinusoidal signal which is varying in phase and amplitude.

It is another object of this invention to provide such a circuit which converts a phase and amplitude varying sinusoidal signal into a square wave which varies in phase and amplitude in proportion to the input signal.

It is another object of this invention to provide such a circuit which divides the frequency of the input signal so that the resulting square wave output has a frequency which is a submultiple of the input frequency.

Further objects, features and advantages of the invention will become apparent from the following description and claims when read in view of the accompanying drawings, wherein like numbers indicate like parts and in which:

The FIGURE shows a preferred embodiment of the inventive circuit.

A sinusoidal signal which can be varying in phase and amplitude is applied to Input Terminal 11. A control or operating signal is injected into the circuit across the Primary 13 of a Transformer 12. The Secondary 14 of Transformer 12 is center grounded as indicated by Center Tap 16. Similar Diodes 17 and 18 are connected across Secondary 14 such that they conduct on alternate half cycles of the signal applied to Primary 13. Consequently, a rectified signal is presented to Filter 19 which receives an input from the Junction 21 of Diodes 17 and 18. Filter 19 contains a Capacitor 22 and an Inductor 23, with the output of the Filter 19 being taken from the junction of these two elements. The values of Capacitor 22 and Inductor 23 are chosen to have the Filter 19 frequency tuned at the desired output frequency of the Filter 19.

A Resistor 24 receives the output of Filter 19 and applies it to Gate Electrode 26 of a field effect Transistor $Q_1$ through a rectifying Diode 27. The source and drain electrodes of FET $Q_1$ are respectively connected to Input Terminal 11 and a smoothing Circuit 29. The output of FET $Q_1$ is therefore smoothed by the connection of Resistor 31 and Capacitor 32 contained within Smoothing Circuit 29. A second field effect Transistor $Q_2$ has its source and drain electrodes 32 and 33 respectively connected between the output of Smoothing Circuit 29 and Output Terminal 34. The Gate Electrode 37 of FET $Q_2$ receives the input signal from the Secondary 14 of Transmitter 12 through a rectifying Diode 38.

The operation of the circuit depends upon the application of the sinusoidal input to Input Terminal 11 at a frequency 2F and a sinusoidal input at a frequency F to Transformer 12. Because of the direct relationship between the two required inputs, the same source can be used for both. Accordingly, the 2F input can be divided by a factor of two and applied as the input to Transformer 12. This is true even though the 2F signal may be phase and amplitude varying because the effects of any such variation will be removed by the operation of the rectifying and filtering circuits. Conversely, the input F to Transformer 12 can be an error signal which is multipled up before its application to Input Terminal 11. Obviously separate sources can be used if power and space requirements and operational characteristics permit. That is, as an example, an oscillator can supply the F input to the Transformer 12 and an error signal can be utilized as the input to Terminal 11. It should be noted that the 2-to-1 relationship of the two frequencies is optional depending upon the frequency desired as the output of the network which will be present on Output Terminal 34. The relationship can be changed simply by cascading additional rectifying-multiplying circuits as will be more fully explained hereinafter.

The network composed of Secondary 14 and Diodes 17 and 18 is a frequency multiplying rectifier. With the Diodes Junction and 18 Diodes across Secondary 14 so that they conduct on alternate half Diodes of the input signal, the signal present at Junction 21 of Diodes 17 and 18 is the result of full wave rectification. The frequency of this signal is therefore twice the frequency of the signal input to Transformer 12 and accordingly is 2F. This is the same as the frequency present at Input Terminal 11. The polarity of the rectified signal at Junction 21 of Diodes 17 and 18 is dependent solely upon the polarity of Diodes 17 and 18. Consequently, by reversing these diodes the polarity of the output signal is also reversed.

Filter 19 receives the rectified and multiplied signal on Capacitor 22. Values for Capacitor 22 and Inductor 23 are selected such that they form a series resonant circuit at a frequency 2F. Such a selection minimizes the impedance of Filter 19 and accordingly reduces its attenuation effects. Also, such a selection maximizes the voltage drop across Inductor 23 and consequently a maximum voltage is applied to Diode 27 through Resistor 24. Capacitor 22 also serves to block any DC component present in the rectified signal. Resistor 39 provides a DC return path for the change of Capacitor 22. In the absence of this resistor capacitor 22 would change to the peak value of the rectified signal. Diodes 17 and 18 would then be back biased and no further signal would be transferred to Filter 19.

The filtered output signal from Filter 19 is a repetitive signal varying at a rate of 2F and having the DC component removed. This signal is applied to Diode 27 where it is again rectified before its application to Gate 26 of FET $Q_1$. Transistor $Q_1$ has its source and drain electrodes respectively connected to Input Terminal 11 and the input to Smoothing Circuit 29. Consequently, as the conduction of FET $Q_1$ varies in response to the rectified gating voltage present on Gate Electrode 26 its output is a fluctuating DC voltage which does not contain any quadrature components which may have been present in the input signal to Terminal 11. Any noise present in the input signal is also removed by the action of FET $Q_1$. Quadrature and other out-of-phase components are removed from the input signal because the FET $Q_1$ conducts only when it is properly biased at Gate 26. This occurs when the rectified signal present on Gate 26 and the input signal to Terminal 11 are either in phase or 180° out of phase, depending upon the polarity of Diodes 17, 18 and 27 and whether FET $Q_1$ is a P channel or an N channel. The choice of FET channel and diode polarity is within the purview of one skilled in the art.

Smoothing Circuit 29 operates on the fluctuating DC output from Transistor $Q_1$ and converts it into a DC voltage at a steady level. Capacitor 32 is also effective in bypassing high frequency components which may be contained in the output signal and assuring that the DC component is applied to Resistor 31. The overall action of the R.C. network containing Resistor 31 and Capacitor 32 is therefore to smooth the DC output from FET $Q_1$ in much the same order as an integrating circuit.

Source Electrode 32 of FET $Q_2$ receives the smooth DC voltage while Gate 37 receives the unrectified signal F from Secondary 14 of Transformer 12 through Rectifying Diode 38. FET $Q_2$ is accordingly gated on at a rate of F. Consequently, the output of FET $Q_2$ is a square wave having a frequency of F. Resistor 36 represents the input impedance of the output network and Resistor 25 represents the output impedance of the input network. If the input to Transformer 12 is the divided error signal, the phase of the square wave output will be the same as the phase of the error signal. However, quadrature components are removed because they cannot gate the Transistor $Q_2$ on at the proper instance.

The frequency of the output signal present on Terminal 34 is seen to be one-half of the input frequency to Terminal 11. This is also true of the gating signal present on Gate 37 of FET $Q_2$ which determines the output frequency. A binary sequence of multiples of input frequency F to Transformer 12 can be obtained by cascading additional multiplying-rectifying circuits. Accordingly, by adding one additional such stage between Junction 21 and Filter 19 a multiplication factor of four is obtained. A multiplication factor of eight is obtained by adding two more such stages, etc.; obviously the input to Gate 37 of FET $Q_2$ will be taken from the last stage.

It is now evident that the inventive circuit removes out-of-phase components and noise from an input signal and simultaneously frequency divides the signal and converts it into a square wave.

Although this invention has been described with respect to a particular embodiment thereof, it is not to be so limited, as changes and modifications may be made therein which are within the spirit and scope of the invention as defined by the appended claims.

I claim:

1. A circuit for rejecting out-of-phase components of a periodically varying signal and converting the frequency and shape of said varying signal comprising: first input means for receiving said signal as a first input signal at a frequency F and applying said signal to a conduction electrode of a first gate means; second input means for receiving a second input signal at a frequency $f$, said frequencies F and $f$ being different and related by an integer multiple N; means for frequency multiplying and rectifying said frequency $f$ signal; means for applying the multiplied-rectified signal to the control electrode of said first gate means; signal modification means for applying the output of said first gate to the conduction electrode of a second gate; means for applying said signal at a frequency $f$ to the control electrode of said second gate means; and output means for receiving the output of said second gate means.

2. The circuit of claim 1 wherein said frequency relationship is $F/f=N$; said first and second input signals are sinusoidal; and the output of said second gate means is a square wave at a frequency $f$.

3. The circuit of claim 2 wherein N=2; and said multiplied-rectified signal has a frequency F.

4. The circuit of claim 3 wherein said first input signal is an error signal and said second input signal is said first input divided by said multiple N.

5. The circuit of claim 4 wherein said means for applying is a filter which removes the DC component from said multiplied-rectified signal and is tuned to pass said frequency F.

6. The circuit of claim 1 wherein said first input signal is an error signal from a sensor in a control system; said second input signal is a reference input; and said integer multiple N is equal to $F/f$.

7. The circuit of claim 6 wherein said means for multiplying-rectifying multiplies said second input signal by a factor equal to N so that the output of said means for multiplying-rectifying is at a frequency equal to F.

8. The circuit of claim 7 wherein said means for applying is a series resonant circuit frequency tuned to a frequency 2F; and said signal modification means is a smoothing circuit.

9. The circuit of claim 6 wherein said first and second gate means are similar field effect transistors; and said control electrodes are the gate electrodes of said transistors.

10. The circuit of claim 9 further including additional rectifier means in the gate circuits of said transistors; said first transistor is gated at a frequency F so that its output is a fluctuating DC voltage; said smoothing circuit is an R.C. network so that a steady DC is applied to the source electrode of said second transistor; said second transistor is gated at a frequency $f$ so that its output is a square wave at a frequency $f$.